(12) United States Patent
Okunaga et al.

(10) Patent No.: US 6,737,373 B2
(45) Date of Patent: May 18, 2004

(54) BARRIER RIBS MATERIAL FOR A PLASMA DISPLAY PANEL

(75) Inventors: Kiyoyuki Okunaga, Hikone (JP); Yoshirou Kitamura, Nagahama (JP); Tatsuya Gotou, Hikone (JP); Masahiko Ohji, Moriyama (JP); Kazuo Hadano, Otsu (JP)

(73) Assignee: Nippon Electric Glass Co., Ltd., Otsu (JP)

( * ) Notice: Subject to any disclaimer, the term of this patent is extended or adjusted under 35 U.S.C. 154(b) by 23 days.

(21) Appl. No.: 10/161,353

(22) Filed: Jun. 3, 2002

(65) Prior Publication Data

US 2003/0073564 A1 Apr. 17, 2003

(30) Foreign Application Priority Data

Jun. 4, 2001 (JP) ........................ 2001/168253

(51) Int. Cl.$^7$ .............................. C03C 8/24; C03C 14/00
(52) U.S. Cl. .............................. 501/32; 501/15; 501/17
(58) Field of Search ............................... 501/15, 17, 32

(56) References Cited

U.S. PATENT DOCUMENTS 5,985,460 A * 11/1999 Wang et al. ................. 428/426
6,572,955 B2 * 6/2003 Terashi et al. .............. 428/209

FOREIGN PATENT DOCUMENTS

| JP | 410251042a | * | 9/1998 |
| JP | 11-162361 | | 6/1999 |
| JP | 2000-1333 | | 1/2000 |
| JP | 2000-1336 | | 1/2000 |

OTHER PUBLICATIONS

Translation of Japanese Document 11–162361, Jun. 1999.*

* cited by examiner

Primary Examiner—Karl Group
(74) Attorney, Agent, or Firm—Collard & Roe, P.C.

(57) ABSTRACT

In a PDP barrier ribs material comprising glass powder and silica-based filler powder, the silica-based filler powder comprises fused silica powder and α-quartz powder. At least a part of the silica-based filler powder is spherical filler powder. The remaining part of the silica-based filler powder may be aspherical filler powder. In this case, the ratio of the spherical filler powder and the aspherical filler powder may be 30:70 to 100:0 in mass ratio.

11 Claims, 1 Drawing Sheet

BARRIER RIBS MATERIAL FOR A PLASMA DISPLAY PANEL

BACKGROUND OF THE INVENTION

This invention relates to a barrier ribs material for a plasma display panel (hereinafter may simply be called a "PDP").

A plasma display is a self-emission flat display and has excellent characteristics such as a light weight, a reduced thickness, and a wide viewing angle. In the plasma display, a display screen can easily be widened. Therefore, the plasma display attracts attention as one of the most promising display devices.

FIG. 1 is a sectional view showing a typical structure of a PDP of the plasma display. The PDP illustrated in FIG. 1 comprises a front glass substrate 1, a rear glass substrate 2 faced to the front glass substrate 1, and a plurality of barrier ribs 3 for dividing a cavity between the front and the rear glass substrates 1 and 2 into a number of gas discharging sections. In the FIGURE, only one gas discharging section is shown. On the front glass substrate 1, a pair of transparent electrodes 4 are formed.

On the transparent electrodes 4, a dielectric layer 5 is formed to cover an entire surface of the front glass substrate 1. In order to stably generate a plasma, the dielectric layer 5 is covered with a protection layer 6 of MgO.

On the rear glass substrate 2, a data electrode 7 is formed between the barrier ribs 3. A phosphor 8 is applied to cover the data electrode 7.

When an electric voltage is applied between the transparent electrodes 4, the plasma is generated in the gas discharging section. Ultraviolet radiation is generated by the plasma and irradiated onto the phosphor 8. The phosphor 8 is excited by the plasma to emit light.

In the PDP illustrated in FIG. 1, the barrier ribs 3 are formed on the rear glass substrate 2. The front glass substrate 1 is faced to the rear glass substrate 2 through the barrier ribs 3. Then, the front and the rear glass substrates 1 and 2 are attached to each other. In this manner, the PDP is formed.

In the PDP illustrated in FIG. 1, the barrier ribs 3 are formed directly on the rear glass substrate 2. In another known PDP, a dielectric layer for electrode protection is formed on the rear glass substrate 2 to cover the data electrode 7 and the barrier ribs are thereafter formed on the dielectric layer.

In order to form the barrier ribs 3, use may be made of a multilayer printing process or a sandblasting process. In the multilayer printing process, screen printing is repeatedly carried out a plurality of number of times at positions where the barrier ribs are to be formed. Thus, a multilayer structure is formed by repeatedly applying a barrier ribs material to thereby form the barrier ribs.

The sandblasting process is carried out in the following manner. On the entire surface of the rear glass substrate, directly or through the dielectric layer, a paste of the barrier ribs material is applied by screen printing and then dried, or alternatively, a green sheet of the barrier ribs material is put. Thus, a barrier rib layer of a predetermined thickness is formed. At predetermined positions on the barrier rib layer, a photosensitive resist is applied to produce a resist film through exposure and development. Thereafter, an area without the resist film is removed by sandblasting to form the barrier ribs at the predetermined positions.

Generally, the barrier ribs material is required to allow firing at a temperature not higher than 600° C. in order to prevent deformation of the glass substrate, to have a coefficient of thermal expansion of 60× to $85 \times 10^{-7}$/°C. (30 to 300° C.) equivalent to that of the glass substrate in order to prevent cracking or separation of the barrier ribs, and to have resistance against an alkali solution used upon forming the barrier ribs.

As the barrier ribs material satisfying the above-mentioned demands, use is generally made of a mixture of glass powder and filler powder. As the glass powder, a low-melting-point glass is used. Generally, a PbO-based glass is widely used. As the filler powder, alumina powder is widely used so as to retain the shape of the barrier ribs and to obtain sufficient strength.

In the meanwhile, the PDP is disadvantageous in that power consumption is high because the phosphor is irradiated with the ultraviolet radiation to emit light. In view of the above, consideration is made of reduction in power consumption. In order to reduce the power consumption, it would be effective to lower the dielectric constant of the barrier ribs. To this end, it is proposed to form the barrier ribs of a porous structure or to use the filler powder having a low dielectric constant as the barrier ribs material.

However, if the barrier ribs have a porous structure, an influence of a gas passing through the barrier ribs may cause degradation in brightness or defective lighting. Furthermore, the strength of the barrier ribs is degraded to cause the barrier ribs to be broken off.

As the filler powder having a low dielectric constant, there is known a silica-based filler such as α-quartz powder or fused silica powder. However, these materials are lower in mechanical strength than alumina. It is therefore difficult to form the barrier ribs having sufficient strength.

SUMMARY OF THE INVENTION

It is therefore an object of this invention to provide a PDP barrier ribs material capable of forming a barrier rib having a low dielectric constant and a high mechanical strength.

As a result of extensive studies, the present inventors have found that the above-mentioned object is achieved by the use of a spherical silica-based filler as filler powder and hereby propose this invention.

According to one aspect of this invention, there is provided a PDP barrier ribs material comprising glass powder and silica-based filler powder, the silica-based filler powder comprising fused silica powder and α-quartz powder, at least a part of the silica-based filler powder being spherical filler powder.

The remaining part of the silica-based filler powder may be aspherical filler powder.

The ratio of the spherical filler powder and the aspherical filler powder may be 30:70 to 100:0 in mass ratio.

The aspherical filler powder may have a 50% average particle size between 0.5 to 3 μm.

The spherical filler powder may have a 50% average particle size between 2 and 8 μm.

The fused silica powder may be spherical and form the spherical filler powder.

On the other hand, the α-quartz powder may be aspherical.

The ratio of the fused silica powder and the α-quartz powder may be 20:80 to 90:10 in mass ratio.

The ratio of the glass powder and the silica-based filler powder may be 70:30 to 95:5 in mass ratio.

The ratio of the spherical fused silica powder and the aspherical α-quartz powder may be 30:70 to 90:10 in mass ratio.

According to another aspect of this invention, there is provided a PDP barrier ribs material comprising glass powder and silica-based filler powder in mass ratio of 70:30 to 95:5, the silica-based filler powder comprising spherical fused silica powder having a 50% average particle size of 2 to 8 µm and aspherical α-quartz powder having a 50% average particle size of 0.5 to 3 µm, the ratio of the fused silica powder and the α-quartz powder being 30:70 to 90:10 in mass ratio.

Throughout the description and the claims, a "spherical" shape is not restricted to a true sphere but is defined as an object having a predetermined width and exhibiting the effect of this invention. Therefore, any shape similar to the sphere is contained also. Specifically, the "spherical" shape is defined as a three-dimensional object formed by a smooth surface at a predetermined uniform distance from the center of spherical shape, allowing a variation of ±25%, preferably, ±15%. Such spherical powder can be obtained, for example, by spraying material powder into a flame.

BRIEF DESCRIPTION OF THE DRAWING

A sole FIGURE is a view for describing the structure of a PDP.

DESCRIPTION OF THE PREFERRED EMBODIMENT

Figure 1:
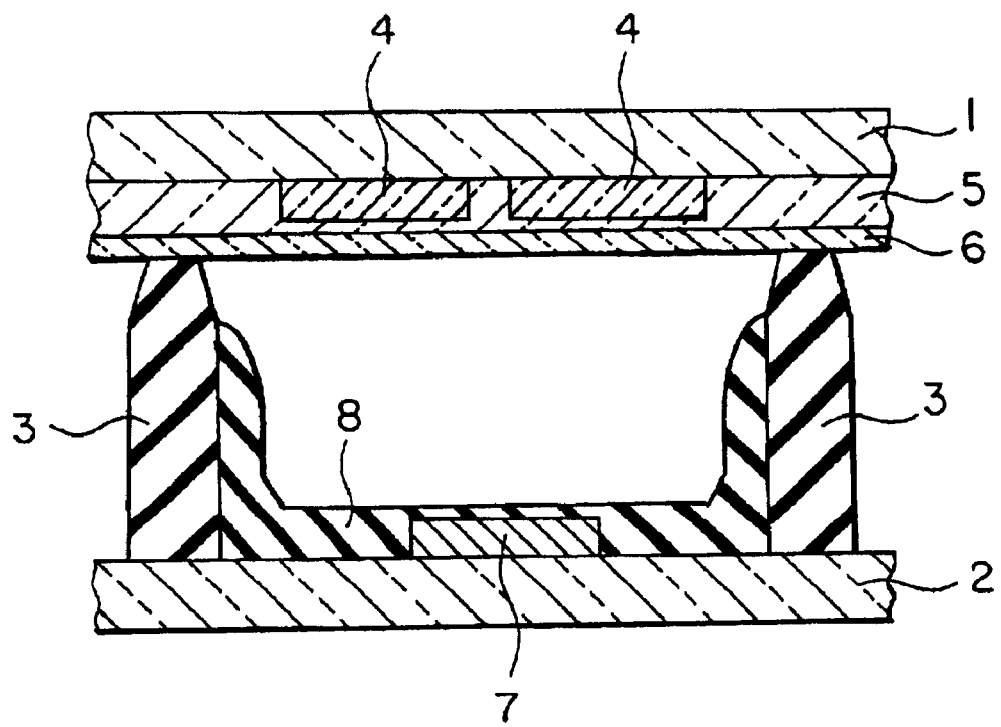

A PDP barrier ribs material according to an embodiment of this invention comprises glass powder and silica-based filler powder. The silica-based filler powder comprises fused silica powder and α-quartz powder. A part or a whole of the silica-based filler powder, i.e., at least a part of the silica-based filler powder is spherical filler powder.

If desired, the PDP barrier ribs material may additionally comprise another silica-based filler, such as cristobalite powder.

Each of the fused silica and the α-quartz has a dielectric constant of 4.5 which is lower than that (dielectric constant of 10) of alumina. Therefore, the dielectric constant of the barrier ribs material as a whole can be lowered.

The spherical filler powder can remarkably relax stress concentration because powder particles have no protrusions. Therefore, a sufficient strength of barrier ribs can be achieved without additionally using a high-strength filler, such as alumina. The fused silica powder or the α-quartz powder need not entirely be spherical but may be only partially spherical.

Although α-quartz can be used as the spherical filler, it is desired to use the fused silica because it is readily available.

The ratio of the spherical filler powder in the silica-based filler powder is desirably equal to 30% or more, particularly 50% or more, in mass ratio. If the spherical filler powder is small in amount, stress concentration easily occurs so that the strength of the barrier ribs is degraded. If the spherical filler powder is contained by 30% or more in mass ratio, it is possible to readily form the barrier ribs having a practically sufficient strength.

The fused silica has a coefficient of thermal expansion of $5 \times 10^{-7}/°C$. in a range of 30 to 300° C. The α-quartz has a coefficient of thermal expansion of $140 \times 10^{-7}/°C$. in a range of 30 to 300° C. By adjusting the contents of the fused silica and the α-quartz, the coefficient of thermal expansion of the barrier ribs material as a whole can be matched to that of the substrate ($60 \times$ to $85 \times 10^{-7}/°C$.) so that cracking or separation due to the difference in expansion can be avoided. The mixing ratio of the fused silica powder and the α-quartz powder is preferably within a range of 20:80 to 90:10, particularly, 30:70 to 70:30, in mass ratio. If the ratio of the low-expansion fused silica powder falls within the above-mentioned range, expansion of the barrier ribs can be adjusted to a range of $60 \times$ to $85 \times 10^{-7}/°C$. matching that of the substrate.

In case where the spherical fused silica powder is used, the mixing ratio of the fused silica powder and the α-quartz powder is desirably within 30:70 to 90:10, particularly, 50:50 to 70:30 in mass ratio, taking the mechanical strength and expansion of the barrier ribs in consideration.

The spherical filler powder preferably has a particle size of 2 to 8 µm (preferably, 3 to 5 µm) in terms of a 50% average particle size ($D_{50}$). If the spherical filler powder has $D_{50}$ of 2 µm or more, a proper dry film strength is achieved and excellent sandblasting ability is obtained. If $D_{50}$ is not greater than 8 µm, high barrier rib strength is achieved without causing degradation in sinterability or structural defect of a fired product. On the other hand, the aspherical filler powder preferably has a particle size $D_{50}$ within a range of 0.5 to 3 µm (more preferably, 1 to 2.5 µm). If $D_{50}$ of the aspherical filler powder is not smaller than 0.5 µm, a proper dry film strength is achieved and excellent sandblasting ability is obtained. In addition, adjustment of viscosity is easy without affecting rheology of the paste. If $D_{50}$ is not smaller than 3 µm, stress concentration hardly occurs.

The glass powder comprises a glass having a coefficient of thermal expansion of $60 \times$ to $90 \times 10^{-7}/°C$. (30 to 300° C.), a dielectric constant of 12.0 or less at 25° C. and 1 MHz, and a softening point of 480 to 630° C. As the glass powder, use is preferably made of a $PbO—B_2O_3—SiO_2$ glass, a $BaO—ZnO—B_2O_3—SiO_2$ glass, and a $ZnO—Bi_2O_3—B_2O_3—SiO_2$ glass.

As the $PbO—B_2O_3—SiO_2$ glass, use may be made of a glass having a composition of, in mass percent, 35–75% PbO, 0–50% $B_2O_3$, 8–30% $SiO_2$, 0–10% $Al_2O_3$, 0–10% ZnO, 0–10% CaO+MgO+SrO+BaO, and 0–6% $SnO_2$+$TiO_2$+$ZrO_2$.

As the $BaO—ZnO—B_2O_3—SiO_2$ glass, use may be made of a glass having a composition of, in mass percent, 20–50% BaO, 25–50% ZnO, 10–35% $B_2O_3$, and 0–10% $SiO_2$.

As the $ZnO—Bi_2O_3—B_2O_3—SiO_2$ glass, use may be made of a glass having a composition of, in mass percent, 25–45% ZnO, 15–40% $Bi_2O_3$, 10–30% $B_2O_3$, 0.5–10% $SiO_2$, and 0–24% CaO+MgO+SrO+BaO.

The glass powder preferably has a 50% average particle size ($D_{50}$) of 1 to 7 µm and a maximum grain size ($D_{max}$) of 5 to 30 µm. If $D_{50}$ is not smaller than 1 µm or $D_{max}$ is not smaller than 5 µm, excellent shape retention is easily obtained. If $D_{50}$ is not greater than 7 µm or $D_{max}$ is not greater than 30 µm, decrease in sinterability hardly occurs.

A filler other than the silica-based filler or other inorganic component can be added. For example, in order to further improve the mechanical strength, alumina powder of 5 mass % or less can be added. In order to change the reflectance, a pigment of 5 mass % or less can be added.

In the above-mentioned PDP barrier ribs material, the mixing ratio of the glass powder and the silica-based filler powder is preferably 70:30 to 95:5 in mass ratio. If the mixing ratio of the silica-based filler powder is not smaller than 5%, excellent shape retention is obtained. If the mixing ratio of the silica-based filler powder is not greater than 30%, sufficient sinterability is obtained so that compact or dense barrier ribs can be formed.

Next, description will be made about how to use the above-mentioned PDP barrier ribs material.

The PDP barrier ribs material can be used, for example, in the form of a paste or a green sheet.

If it is used in the form of the paste, thermoplastic resin, a plasticizer, and a solvent are used together with the glass powder and the filler powder. The content of the glass powder and the filler powder in the paste is generally on the order of 30 to 90 mass %.

The thermoplastic resin is a component which serves to improve a film strength after dried and to provide flexibility. The content is generally on the order of 0.1 to 20 mass %. As the thermoplastic resin, use may be made of polybutyl methacrylate, polyvinyl butyral, polymethyl methacrylate, polyethyl methacrylate, and ethyl cellulose. These substances may be used alone or in combination.

The plasticizer is a component which serves to control a drying rate and to provide flexibility to a dry film. The content is generally on the order of 0 to 10 mass %. As the plasticizer, use may be made of butyral benzyl phthalate, dioctyl phthalate, diisooctyl phthalate, dicapryl phthalate, and dibutyl phthalate. These substances may be used alone or in combination.

The solvent is used to form a paste from the material. The content is generally on the order of 10 to 30 mass %. As the solvent, use may be made of terpineol, diethylene glycol monobutyl ether acetate, and 2,2,4-trimethyl-1,3-pentadiol monoisobutyrate. These substances may be used alone or in combination.

The paste is produced by preparing the glass powder, the filler powder, the thermoplastic resin, the plasticizer, the solvent, and so on and by kneading these substances at a predetermined ratio.

Description will be made of a method of producing, for example, the barrier ribs by the use of the paste. At first, the paste is applied by screen printing or batch coating to form an application layer having a predetermined thickness. Thereafter, the application layer is dried into a dry film. Then, a resist film is formed on the dry film and subjected to exposure and development. After unnecessary portions are removed by sandblasting, the dry film is fired to obtain the barrier ribs of a predetermined shape.

If the PDP barrier ribs material is used in the form of the green sheet, the thermoplastic resin and the plasticizer are used together with the glass powder and the filler powder. The content of the glass powder and the filler powder in the green sheet is generally on the order of 60 to 80 mass %.

As the thermoplastic resin and the plasticizer, use may be made of similar substances to those used in preparing the paste. The mixing ratio of the thermoplastic resin is generally on the order of 5 to 30 mass %. The mixing ratio of the plasticizer is generally on the order of 0 to 10 mass %.

Description will be made of a typical method of producing the green sheet. Preparation is made of the glass powder, the filler powder, the thermoplastic resin, the plasticizer, and so on. To these materials, a main solvent such as toluene and an auxiliary solvent such as isopropyl alcohol are added to obtain a slurry. The slurry is applied on a film such as polyethylene terephthalate (PET) by the doctor blade method to be formed into a sheet. The slurry formed into the sheet is dried to remove the solvents. Thus, the green sheet is obtained.

The green sheet obtained as mentioned above is thermocompression-bonded at a position where a glass layer is to be formed. Thereafter, the green sheet is fired. Thus, the glass layer is formed. In case where the barrier ribs are formed, the application layer is formed by thermocompression bonding and then configured into a predetermined barrier rib shape in the manner similar to the paste.

Description has been made about the sandblasting process using the paste or the green sheet by way of example. However, this invention is not restricted to these methods but is applicable to a multilayer printing process, a lift-off process, a photosensitive paste process, a photosensitive green sheet process, a press forming process, a transfer process, and other various forming processes.

Next, description will be made of specific examples of the PDP barrier ribs material according to this invention.

[Glass Powder]

Tables 1 to 3 show compositions and characteristics of the glass powder for use in the PDP barrier ribs material. Tables 1, 2, and 3 show the $PbO$—$B_2O_3$—$SiO_2$ glass, the $BaO$—$ZnO$—$B_2O_3$—$SiO_2$ glass, and the $ZnO$—$Bi_2O_3$—$B_2O_3$—$SiO_2$ glass, respectively.

TABLE 1

|  | A | B | C |
|---|---|---|---|
| composition (mass %) |  |  |  |
| PbO | 40.0 | 55.0 | 63.0 |
| $B_2O_3$ | 45.0 | 30.0 | 10.0 |
| $SiO_2$ | 10.0 | 10.0 | 27.0 |
| $Al_2O_3$ | 5.0 | 5.0 | — |
| softening point (° C.) | 570 | 540 | 550 |
| dielectric constant (25° C., 1 MHz) | 6.5 | 8.0 | 11.0 |
| coefficient of thermal expansion [30–300° C.] ($\times 10^{-7}$/° C.) | 65 | 68 | 70 |

TABLE 2

|  | D | E | F |
|---|---|---|---|
| composition (mass %) |  |  |  |
| BaO | 38.0 | 33.7 | 26.6 |
| ZnO | 30.6 | 42.9 | 42.3 |
| $B_2O_3$ | 31.4 | 16.8 | 24.1 |
| $SiO_2$ | — | 6.6 | 7.0 |
| softening point (° C.) | 602 | 592 | 615 |
| dielectric constant (25° C., 1 MHz) | 9.5 | 10.0 | 9.0 |
| coefficient of thermal expansion [30–300° C.] ($\times 10^{-7}$/° C.) | 85 | 71 | 67 |

TABLE 3

|  | G | H | I |
|---|---|---|---|
| composition (mass %) |  |  |  |
| ZnO | 32.0 | 33.0 | 27.0 |
| $Bi_2O_3$ | 26.0 | 26.0 | 39.0 |
| $B_2O_3$ | 27.0 | 21.0 | 19.0 |
| $SiO_2$ | 2.0 | 5.0 | 7.0 |
| CaO | 13.0 | 15.0 | 8.0 |
| softening point (° C.) | 565 | 576 | 568 |
| dielectric constant (25° C., 1 MHz) | 11.0 | 10.5 | 11.0 |
| coefficient of thermal expansion [30–300° C.] ($\times 10^{-7}$/° C.) | 85 | 83 | 85 |

At first, various oxides as glass raw materials were mixed to obtain the compositions shown as samples A to I in Tables 1 to 3. Thereafter, the mixture was put in a platinum crucible and melted at 1250° C. for two hours to obtain a uniform glass film. The glass film was pulverized by an alumina ball and classified to obtain glass powder having $D_{50}$ of 3 μm and $D_{max}$ of 20 μm.

The glass powder thus obtained was measured for the softening point, the dielectric constant, and the coefficient of thermal expansion. As a result, the softening point was 540 to 615° C. The dielectric constant was 6.5 to 11.0. The coefficient of thermal expansion was 65× to 85×$10^{-7}$/°C. (30 to 300° C.).

The particle size distribution of the glass powder was measured by the use of the particle size analyzer SALD-2000J manufactured by Shimadzu Corporation. While $D_{50}$ was measured, the maximum particle size was calculated as an integrated value of 99.9%. The refractive index used in calculation of the particle size distribution had values of 1.9 and 0.05i for a real part and an imaginary part, respectively.

[Filler Powder]

Table 4 shows the filler powder for use in the PDP barrier ribs material.

TABLE 4

|  | a | b | c | d | e | f | g | h |
|---|---|---|---|---|---|---|---|---|
| shape | spherical | spherical | spherical | aspherical | aspherical | spherical | spherical | aspherical |
| crystal structure | fused silica | fused silica | fused silica | α-quartz | α-quartz | alumina | fused silica | fused silica |
| $D_{50}$ | 3 | 4 | 11 | 1.7 | 1 | 3 | 1 | 3 |

As the filler powder (samples a–h), use was made of commercially available products having shapes and particle sizes shown in Table 4.

[Barrier Ribs Material]

Tables 5 and 6 show specific examples (samples Nos. 1–11) of the PDP barrier ribs material and comparative examples (samples Nos. 12–15).

TABLE 5

|  | examples | | | | | | |
|---|---|---|---|---|---|---|---|
|  | 1 | 2 | 3 | 4 | 5 | 6 | 7 |
| type of glass powder | A | B | C | D | E | F | G |
| content (mass %) | 85 | 70 | 90 | 85 | 90 | 85 | 75 |
| type of filler powder | a | b | a | a | a | a | b |
| content | 8 | 20 | 6 | 10 | 8 | 10 | 20 |
|  | d | d | d | e | e | d | e |
|  | 7 | 10 | 4 | 5 | 2 | 5 | 5 |
| softening point (° C.) | 575 | 565 | 550 | 610 | 600 | 620 | 570 |
| dielectric constant (25° C., 1 MHz) | 6.0 | 6.6 | 9.5 | 8.2 | 9.0 | 7.8 | 7.6 |
| coefficient of thermal expansion [30–300° C.] (×10$^{-7}$/° C.) | 69 | 60 | 69 | 76 | 65 | 65 | 74 |
| cracking load (g) | 300 | 350 | 250 | 300 | 250 | 300 | 350 |
| vibration resistance | ○ | ○ | ○ | ○ | ○ | ○ | ○ |

TABLE 6

|  | examples | | | | comparative examples | | | |
|---|---|---|---|---|---|---|---|---|
|  | 8 | 9 | 10 | 11 | 12 | 13 | 14 | 15 |
| type of glass powder | H | I | B | H | A | D | G | G |
| content mass % | 94 | 80 | 90 | 90 | 80 | 80 | 80 | 80 |
| type of filler powder | b | b | c | a | a | d | h | f |
| content | 5 | 15 | 6 | 4 | 20 | 20 | 10 | 15 |
|  | d | e | d | e | — | — | d | g |
|  | 1 | 5 | 4 | 6 | — | — | 10 | 5 |
| softening point (° C.) | 580 | 575 | 545 | 580 | 575 | 610 | 575 | 575 |
| dielectric constant (25° C., 1 MHz) | 9.5 | 8.6 | 7.2 | 9.3 | 5.6 | 7.6 | 8.6 | 10.5 |
| coefficient of thermal expansion [30–300° C.] (×10$^{-7}$/° C.) | 77 | 70 | 70 | 80 | 44 | 103 | 83 | 74 |
| cracking load (g) | 250 | 300 | 200 | 200 | 200 | 150 | 150 | 250 |
| vibration resistance | ○ | ○ | ○ | ○ | ○ | X | X | ○ |

In the ratio shown in Tables 5 and 6, the glass powder in Tables 1 to 3 and the filler powder in Table 4 were mixed to obtain the PDP barrier ribs material. The barrier ribs material thus obtained was evaluated for the softening point, the dielectric constant, the coefficient of thermal expansion, and the mechanical strength (cracking load and vibration resistance).

As a result, the samples Nos. 1–11 had the dielectric constant as low as 9.5 or less and the cracking load as high as 200 g or more. Thus, the samples Nos. 1–11 had the mechanical strength practically sufficient. The coefficient of thermal expansion fell within a range of 60× to 80×10$^{-7}$/°C. which is similar to the coefficient of thermal expansion of the glass substrate. In particular, the samples Nos. 1–9 containing 50% or more spherical filler powder having $D_{50}$ within a range of 2 to 8 μm had a very high cracking load of 250 g or more.

The softening point was measured by the use of the macro differential thermal analyzer as a fourth inflection point.

The dielectric constant was measured by a disk process at 25° C. and 1 MHz after each sample was powder-pressed and fired.

The coefficient of thermal expansion was measured in the following manner. Each sample was powder-pressed and fired. Thereafter, the sample was polished into a cylindrical shape having a diameter of 4 mm and a length of 40 mm. Measurement was carried out in accordance with JIS R3102. Then, the value within a temperature range of 30 to 300° C. was obtained.

The cracking load was measured in the following manner. Each sample was fired at the softening point of the barrier ribs material for 10 minutes. Against the surface of a fired body thus obtained, a diamond indenter of the Vickers hardness meter was pressed. When cracks are produced at corners of square indentation, the load was measured as the cracking load. As this value is greater, the mechanical strength is greater.

The vibration resistance was evaluated as follows. Each sample was fired at the softening point of the barrier ribs material for 10 minutes to obtain a fired body having a dimension of 3×4×36 mm. The surface of 4×36 mm of the sintered body was polished by a #2000 alumina polisher. The three-point bending test was preliminarily carried out at a span of 30 mm to obtain a bending fracture load. The loads corresponding to 90% and 80% of the bending fracture load were repeatedly applied by the use of a 10 Hz sinusoidal wave. Evaluation was carried out by the reduction in number of amplitude iterations. Specifically, the number of amplitude iterations at fracture under the 90% load is represented by n90. Likewise, the number of amplitude iterations at fracture under the 80% load is represented by n80. When the ratio n80/n90 was equal to 90% or more and was smaller than 90%, the samples were labeled ○ and X, respectively.

What is claimed is:

1. A PDP barrier ribs material comprising glass powder and silica-based filler powder, the silica-based filler powder comprising fused silica powder and α-quartz powder, at least a part of the silica-based filler powder comprising spherical particles having a spherical share which is defined as a three-dimensional object having a smooth surface at a predetermined uniform distance from the center of the spherical shape, allowing a variation of ±25%.

2. A PDP barrier ribs material according to claim 1, wherein the remaining part of the silica-based filler powder is aspherical filler powder.

3. A PDP barrier ribs material according to claim 2, wherein the ratio of the spherical filler powder and the aspherical filler powder is 30:70 to 100:0 in mass ratio.

4. A PDP barrier ribs material according to claim 2, wherein the aspherical filler powder has a 50% average particle size between 0.5 and 3 μm.

5. A PDP barrier ribs material according to claim 1, wherein the spherical filler powder has a 50% average particle size between 2 and 8 μm.

6. A PDP barrier ribs material according to claim 1, wherein the fused silica powder is spherical and forms the spherical filler powder.

7. A PDP barrier ribs material according to claim 6, wherein the α-quartz powder is aspherical.

8. A PDP barrier ribs material according to claim 7, wherein the ratio of the fused silica powder and the α-quartz powder is 30:70 to 90:10 in mass ratio.

9. A PDP barrier ribs material according to claim 1, wherein the ratio of the glass powder and the silica-based filler powder is 70:30 to 95:5 in mass ratio.

10. A PDP barrier ribs material according to claim 1, wherein the ratio of the fused silica powder and the α-quartz powder is 20:80 to 90:10 in mass ratio.

11. A PDP barrier ribs material comprising glass powder and silica-based filler powder in mass ratio of 70:30 to 95:5, the silica-based filler powder comprising spherical fused silica powder having a 50% average particle size of 2 to 8 μm and aspherical α-quartz powder having a 50% average particle size of 0.5 to 3 μm, the ratio of the spherical fused silica powder and the aspherical α-quartz powder being 30:70 to 90:10 in mass ratio, the spherical fused silica powder comprising spherical particles each having a spherical shape which is defined as a shape of a three-dimensional object having a smooth surface at a predetermined uniform distance from the center of the spherical shape allowing a variation of ±25%.

* * * * *